United States Patent [19]
Draggett

[11] 3,847,070
[45] Nov. 12, 1974

[54] MACHINE TO CUT THE ENDS OFF ONIONS OR THE LIKE

[75] Inventor: Henry A. Draggett, Fredonia, N.Y.

[73] Assignee: Ajax Flexible Coupling Co., Inc., Westfield, N.Y.

[22] Filed: Oct. 12, 1972

[21] Appl. No.: 297,003

[52] U.S. Cl.................... 99/643, 99/567, 99/635, 198/33 R
[51] Int. Cl............................................ A23n 15/04
[58] Field of Search ............ 99/643, 642, 639, 636, 99/635, 567; 198/29, 30, 33 R, 34

[56] References Cited
UNITED STATES PATENTS

| | | | |
|---|---|---|---|
| 2,494,914 | 1/1950 | Urschel et al. | 99/636 |
| 2,577,086 | 12/1951 | Magnuson | 99/636 |
| 2,974,699 | 3/1961 | Boles et al. | 99/636 |
| 3,623,524 | 11/1971 | Buck | 99/636 |

*Primary Examiner*—Harvey C. Hornsby
*Assistant Examiner*—Arthur O. Henderson

[57] ABSTRACT

A machine for removing ends from onions or the like. The onions are fed from a hopper oriented and fed between two rotating knives. The knives move toward and away from each other along their axes of rotation which are parallel to each other. The onions are fed down a chute against a stop. The conveyor has a chain with spaced flights. Each flight has two upwardly extending pins spaced from each other laterally which straddle the stop and advance the onion along a plate over pads of rubber sheets. A gripping member supported on a second chain grips the onions, lifts them from the conveyor, carries them between the rotating knives where the heads and tails are removed, then the onions are released into a repository.

6 Claims, 3 Drawing Figures

MACHINE TO CUT THE ENDS OFF ONIONS OR THE LIKE

GENERAL STATEMENT OF THE INVENTION

In the processing of onions for canning or bottling, it is necessary to remove the heads and tails from the vegetable. Present methods of accomplishing this require that the onions be manually oriented and placed in a carrier which transports the onions past rotating knives which remove the heads and tails.

This disclosure relates to a machine which automatically feeds onions singly from a bulk supply hopper, orients them and removes the heads and tails. Subsequent operations remove the skins from the onions.

OBJECTS OF THE INVENTION

It is an object of the invention to provide an apparatus for continuously trimming heads and tails from vegetables and fruits such as onions.

Another object of the invention is to provide an improved means for removing the ends of onions or the like.

Another object of the invention is to provide a machine for processing onions which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
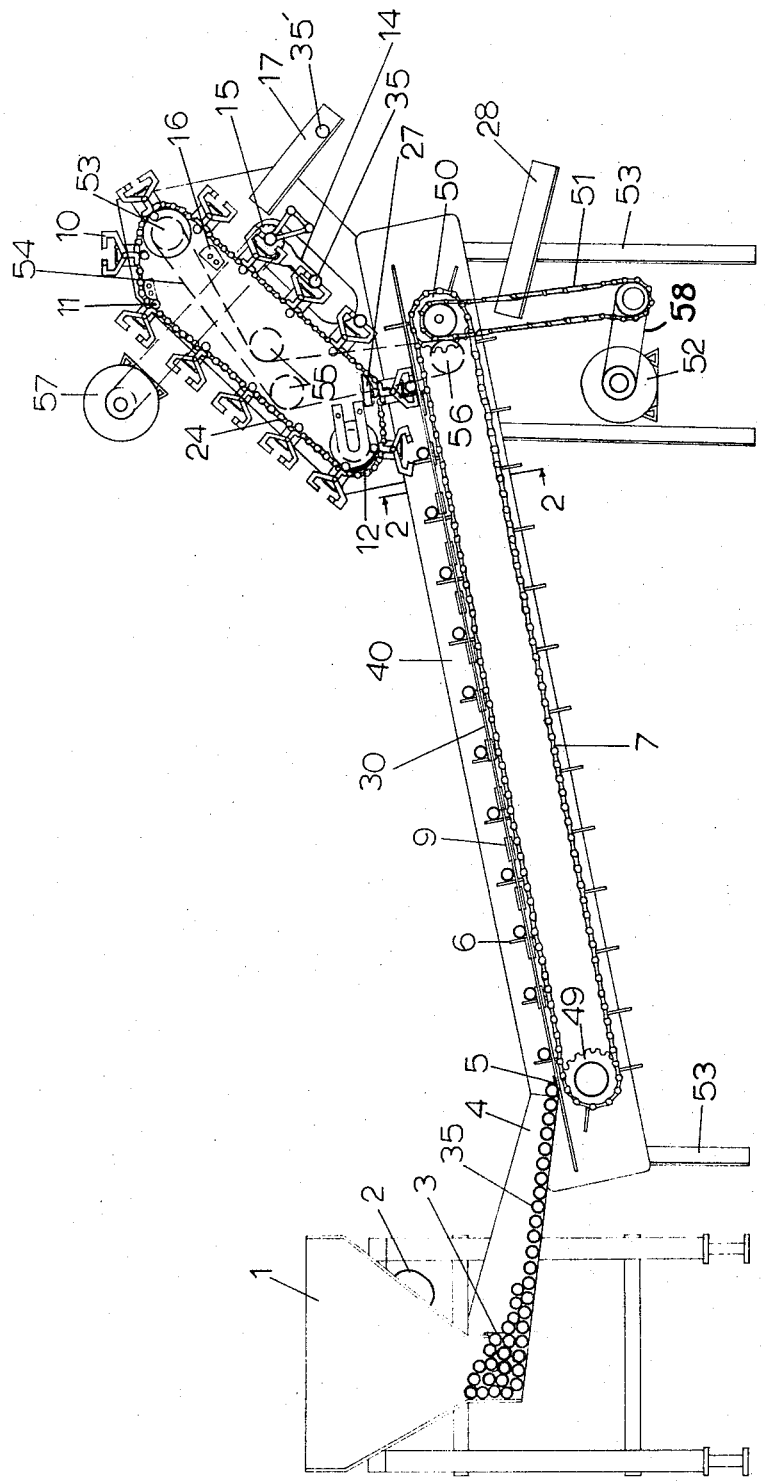
FIG. 1 is a longitudinal cross sectional view of the machine according to the invention.
Figure 3:
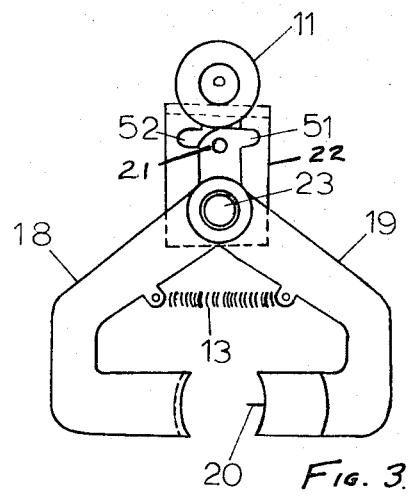
FIG. 3 is an enlarged view of one of the gripping members that lift the onions.
Figure 2:
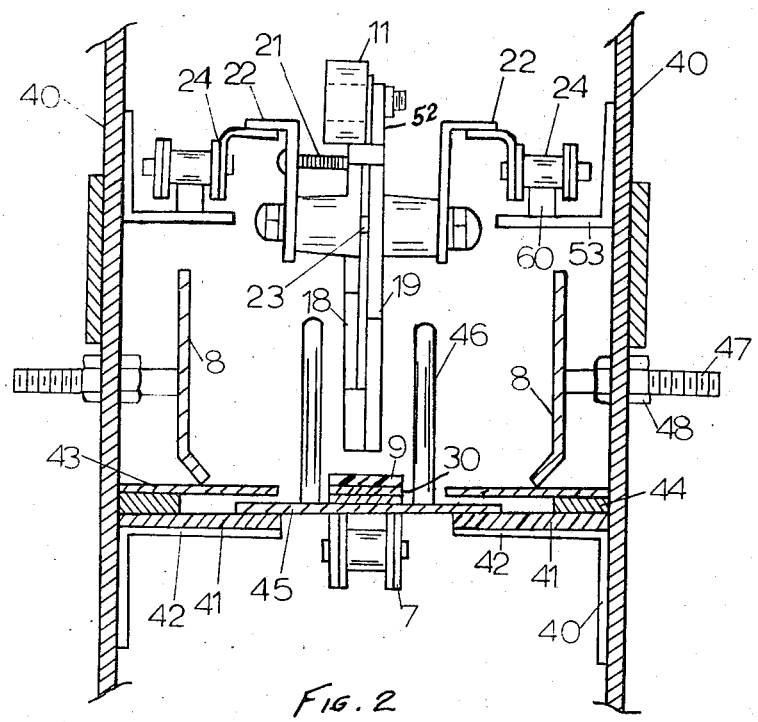
FIG. 2 is a cross sectional view taken on line 2—2 of FIG. 1.

Now with more particular reference to the drawings, the machine is shown generally in FIGS. 1, 2, and 3. The machine is made up principally of the hopper 1 with vibrator 2 supported on it and trough chute 4 that is operatively associated with and discharges into the first chain conveyor 7. The chain conveyor has the laterally spaced fingers or pins 6 that extend upwardly from the longitudinally spaced flights and these pins straddle the stop 5 which is fixed to the bottom 30 of the trough 40. The onions or the like 35 which are shown by way of example, move down the chute 4 against the stop 5, they are carried by the pins 6 along the plate 30 which forms the bottom of the trough and are gripped by the arms 19 and 20 and carried by the clasps between the rotating knives 15, then discharged down the chute 17 to a suitable repository. The rotating knives are in the form of disks with serrated edges.

The hopper is supported on a fixed frame as shown and has a vibrator 2 attached to one side. The vibrator may be any of the suitable electrical bin vibrators which are familiar to those skilled in the art. The onions 35 move past a flexible element in the form of a sheet 3, down the trough chute 4 and come to rest against the stop 5. The stop 5 is in the form of an angle in the center of the bottom plate 30 of the trough. The flexible element 3 prevents the onions from overloading the trough.

The spaced side plates 40 are fixed in spaced relation to each other and the laterally extending plates 41 are supported on angle members 42 that are fixed to the plates 40. Supported above the plates 41 are the plates 43 which are held in spaced relation to the plates 41 by the spacers 44. The plates 45 are fixed to the chain 11 of the conveyor and the plates 45 have the pins or fingers 6 fixed to them and held in spaced relation. Inclined plate 30 is fixed in relation to plates 40 and resilient pads 9 are fixed to plate 30. The fingers 6 straddle the incined plate 30. The adjustable sides 8 are supported on threaded bolts 47 which extend through the side plates 40 and are locked in position by nuts 48. The chain 7 is carried on the idler sprocket 49 and the driven sprocket 50. The driven sprocket 50 is driven by the chain 51 by a suitable motor 52. The conveyor made up of the chain 7, sprockets 49 and 50 and motor 52 are carried on the frame having legs 53.

Thus the pregraded products, for example onions, are fed into the hopper 1 which is vibrated by the bin vibrator 2. Flexible element 3 prevents the onions overloading the trough 4, which is rigidly attached to the vibrating hopper 1. The graded onions leave the trough 4, rest against the stop 5. Pairs of fingers 6 attached to the driven chain 7 lift the onions over the stop 5 and convey them up an inclined plate 30 which is inclined at approximately 10° to the horizontal. The onions are confined to a path up the plate by the side boards 8 adjusted inwardly to allow the onions to freely pass yet having limited movement laterally. As they move along up the inclined trough 30, they hit the bump pads 9 which are attached to the plate 30 which assist in orienting the onions so that the tops and tails are perpendicular to the longitudinal axis of the conveyor. The properly oriented onions are removed from the conveyor trough by the clasps 10. Clasps 10 are shown specifically in FIG. 3 and generally in FIG. 2. The clasps each have two arms 18 and 19 which are pivoted together at 23 and mounted on an axle 23. The first ends of clasps 10 are urged together by a spring 13. The arms 18 and 19 extend past the pivot 23 to second ends which are to the extensions 51 and 52. Wheel 11 is attached to extension 52. The axle 23 is attached to carrier clips 22 which are fixed to the spaced chains 24. Chains 24, wheels 11, and clasps 10 make up a second conveyor. The chains 24 are guided along the chainways 53 which are in turn fixed to plates 40. The chains are of a type known as roller chains and the rollers are carried by bearing surface 60 which may be made of a material having a low coefficient of friction. Rotation of the arms 18 is limited by the bolt keeper 21 which is fixed to the extension 51 and engages clips 22. The arm 19 can rotate through approximately 75 degrees. The two arms 18 and 19 are continuously urged toward closed position by the spring 13 which is attached at its opposite ends to the lugs on arms 18 and 19. As the wheel 11 leaves the cam 27, the clasps are urged closed by spring 13. The force of spring 13 causes the pin 20 to pierce the onion and aids in forming a secure grip on it. The clasps 10 are carried by two chains 24 in a counter clockwise direction.

The chains 24 transport the pregraded onions 35 through feelers 14 which move rotating knives 15 laterally to adjust to the length of the product and remove the desired amount from each end. The chute 28 is situated under the knives 15 to catch and remove the trimmings. As the clasp 10 approaches the cam 16, the wheel 11 on arm extension 19 comes in contact with that cam, forcing the arm 19 to rotate in a counter clockwise direction thus opening clasp 10 and allowing the trimmed product 35' to fall into chute 17 which directs the trimmed product 35' to the next processing step. The clasps 10 are then carried by chains 24 past cam 12 which forces open arm 19. Each open clasp 10 is then positioned by chains 24 to clasp another pregraded product 35 from the trough 30.

The chain 24 is driven from a sprocket 53 which is in turn driven from chain 54 over idler pulley 55 and to the drive pulley 56 which is in turn driven from the chain 51 and belt 58. Motor 57 drives the rotating knives 15. Knives 15 may be of the type and operated in the manner of the knives shown in U.S. Pat. No. 3,623,524. The onions 35' that have been processed are fed down the chute 17 to a suitable receiving container and waste products, such as the heads and tails cut from the onions, are dropped into the waste chute 28 from which they are discharged into a suitable discharge area.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for removing ends from articles that are like onions in shape comprising,
   a first conveyor having spaced articles receiving positions thereon,
   means for feeding said articles in sequence to said first conveyor,
   a second conveyor,
   a plurality of spaced cutting members for removing said ends from said articles,
   gripping means on said second conveyor for transferring said articles from said first conveyor to said second conveyor, said gripping means engaging said articles on opposite sides thereof generally midway between said ends and moving said articles between said cutting members whereby said ends are removed,
   means to discharge said articles from said second conveyor,
   said first conveyor having a bottom and sides extending upwardly from said bottom,
   means for adjusting said sides of said first conveyor toward and away from each other,
   said sides being adapted to be spaced from each other a distance slightly greater than the distance between the ends of said articles,
   a chute for feeding articles to said first conveyor,
   a stop member supported at an end of said chute adjacent said first conveyor,
   said first conveyor having a continuous chain member,
   a platelike member supported on said platelike chain member, laterally spaced pins fixed to said continuous member,
   said spaced pins being adapted to move along each side of said stop to move said articles from said stop up said first conveyor to said second conveyor.

2. The machine recited in claim 1 wherein said stop is disposed adjacent the lateral center of said conveyor, said pins move in paths along said conveyor on each side of said stop.

3. A machine for removing the heads and tails from onions comprising,
   a hopper for onions having heads and tails thereon,
   two spaced rotating knives supported to slide axially toward and away from each other,
   a first conveyor inclined upwardly toward a second conveyor,
   said second conveyor inclined upwardly toward said spaced rotating knives,
   a chute leading from said hopper to said second conveyor,
   said chute being inclined from said hopper toward said second conveyor and terminating above the lower end of said second conveyor,
   said second conveyor comprising an endless chain,
   means on said machine for driving said endless chain,
   said second conveyor having a bottom plate fixed to said machine,
   a stop member attached to said bottom plate, and extending upwardly therefrom and disposed adjacent said chute,
   said chain having longitudinally spaced flights movable under said plate thereon,
   two laterally spaced pins fixed to each said flight and extending upwardly therefrom,
   one said pin being adapted to run on each side of said stop whereby onions passing from said hopper down said chute into engagement with said stop are moved up said second conveyor by said pins,
   said first conveyor having spaced pairs of arms thereon,
   said arms being swingably connected together at an intermediate part and adapted to have one end of each said arm swing toward each other,
   means on said second end of each said arm for engaging an onion,
   cam means on the said second end each said arm supported on said machine adjacent said second conveyor whereby said arms are swung away from each other,
   and spring means urging said first arms of said gripping means toward each other to engage an onion,
   second cam means adjacent said rotating knives for moving said arms away from each other release said onions,
   means to drive said rotating knives,
   resilient means urging said knives toward each other.

4. The machine recited in claim 1 wherein said gripping means comprises first arms and second arms,
   each said first arm being pivoted to a second arm and attached to said conveyor,
   spring means urging first end of each said first arm toward a gripping means on said second arm,
   cam means to swing each said first arm away from said second arm when it approaches an onion fed to said conveyor, and said spring means urging first ends of said arms to swing toward each other to grip a said onion and carry it between said rotating knives, cam means adjacent said rotating knives for opening said first arm from said second arm whereby said onion is released.

5. The machine recited in claim 4 wherein each said first end of said first arm is bent toward a first end of said second arm, and a relatively short pin is fixed to said second arm for piercing a said onion and holding said onion against rotation on said arms while it is being cut by said rotating knives.

6. The machine recited in claim 4 wherein said second conveyor has spaced chains and said clasp means comprising a first arm and a second arm, axle means swingably connecting said arm together, said axle means being supported between said chains.

* * * * *